(12) United States Patent
Okajima et al.

(10) Patent No.: US 7,608,316 B2
(45) Date of Patent: Oct. 27, 2009

(54) EXTRUDED PRODUCT

(75) Inventors: Kurato Okajima, Aichi-ken (JP); Masanori Aritake, Aichi-ken (JP); Hitoshi Omori, Aichi (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 513 days.

(21) Appl. No.: 11/059,661

(22) Filed: Feb. 17, 2005

(65) Prior Publication Data

US 2005/0186396 A1    Aug. 25, 2005

(30) Foreign Application Priority Data

Feb. 19, 2004   (JP)   ............... P2004-043118
Jun. 18, 2004   (JP)   ............... P2004-180453

(51) Int. Cl.
  *B32B 3/04*   (2006.01)
  *E06B 7/16*   (2006.01)
  *E04C 2/38*   (2006.01)

(52) U.S. Cl. ............... 428/122; 52/716.2; 52/716.3; 49/490.1; 49/498.1

(58) Field of Classification Search ............... 428/167, 428/122, 172; 49/475.1, 490.1, 498.1; 52/716.2, 52/716.5, 717.03, 717.04
See application file for complete search history.

(56) References Cited

U.S. PATENT DOCUMENTS

| 5,753,063 A | | 5/1998 | Sakakibara et al. | |
|---|---|---|---|---|
| 5,804,285 A | * | 9/1998 | Kobayashi et al. | ............ 428/172 |
| 6,110,546 A | | 8/2000 | Honda et al. | |
| 6,245,409 B1 | | 6/2001 | Cook | |
| 6,571,514 B1 | * | 6/2003 | Aritake | ............ 49/490.1 |
| 6,803,090 B2 | * | 10/2004 | Castiglione et al. | ............ 428/172 |
| 2001/0033927 A1 | | 10/2001 | Omori et al. | |
| 2004/0090077 A1 | * | 5/2004 | Montagna et al. | ............ 296/39.2 |

FOREIGN PATENT DOCUMENTS

| EP | 0 719 637 A3 | 11/1996 |
|---|---|---|
| FR | 1.421.604 | 11/1964 |
| JP | S62-19450 U | 2/1987 |
| JP | H06-106597 | 4/1994 |
| JP | A-H08-174620 | 7/1996 |
| JP | 11-099887 A | 4/1999 |
| JP | 11-180226 A | 7/1999 |
| JP | 2000-141403 * | 5/2000 |
| JP | A-2002-146087 | 5/2002 |
| JP | WO2005028231 | 3/2005 |
| WO | WO 2005/028231 A1 | 3/2005 |

OTHER PUBLICATIONS

Japanese Office Action dated Oct. 10, 2008 in corresponding Japanese patent application No. JP 2004/180453 (and an English translation).

* cited by examiner

*Primary Examiner*—Donald Loney
(74) *Attorney, Agent, or Firm*—Posz Law Group, PLC

(57) ABSTRACT

An extruded product formed by extrusion molding and continuing in a longitudinal direction includes: an extruded product body; and a decoration layer provided integrally on a surface of the extruded product body, wherein the decoration layer is provided on a substantially entire surface of the decoration layer by combining an irregular surface pattern and a plurality of linear grooves on the surface thereof, and the depth of the linear groove is deeper than the depth of the irregular surface pattern.

6 Claims, 5 Drawing Sheets

EXTRUDED PRODUCT

BACKGROUND OF THE INVENTION

1. Field of the Invention

The present invention relates to an extruded product which is formed by extrusion molding, continues in a longitudinal direction, and has a decoration layer on the surface of an extruded product body. More particularly, the present invention concerns an extruded product which is formed by extrusion molding, such as a weather strip for a vehicle and vehicle for providing a seal between an opening in a vehicle body and a door of a vehicle or a trunk lid, or the like.

2. Description of the Related Art

An extruded product such as a weather strip for a vehicle is formed by extrusion molding. In this case, after extrusion molding is effected by using a material such as synthetic rubber, a thermoplastic elastomer, or the like, in the case of the synthetic rubber the extruded piece is vulcanized in a vulcanizing device to thereby form the extruded product. After the extruded product is then cut to a predetermined size, corner portions and the like are formed by injection molding, and a product such as a weather strip for a vehicle is thereby obtained (e.g., refer to JP-A-6-106597 (pp. 3-5, FIG. 4)).

In the case of the weather strip for the vehicle, its body is generally formed of synthetic rubber or a thermoplastic elastomer, in which case the body is frequently formed in black in the light of the relationship of compounding materials.

However, products having various surface patterns and colors have come to be required for the purpose of matching with interior products in the vehicle compartment and for improving the appearance. Also, the provision of special materials on the surface has also come to be required for the purpose of improving weather resistance, chemical resistance, and the like.

Due to the above-described requirements, it has been practiced to provide a fabric, a skin material, or a colored decoration layer on the surface of the body of the extruded product of the weather strip for a vehicle.

To provide the decoration layer on the surface of the body of the extruded product, as shown in FIGS. 1 and 2, a weather strip body 51, which serves as the extruded product body formed by extrusion molding and vulcanized in a vulcanizing device (not shown), is subjected to preforming so as to be slightly bent by a primary preforming machine 2. An adhesive or a primer is then applied onto the weather strip body 51 by using an adhesive or by a primer application machine. In addition, a decoration layer is extruded in sheet form onto the weather strip body 51 by an extruding die 40 connected to an extrusion molding machine 10. Subsequently, a decoration layer 157 extruded into sheet form is press fitted to the weather strip body 51 by a laminating machine 160, thereby allowing the decoration layer 157 to be bonded to the weather strip body 51. Furthermore, a weather strip 50 which has been cooled in a cooling device 5 is taken up onto a takeup machine 6 (e.g., JP-A-8-174620 (pp. 2-4, FIGS. 1-4)).

Subsequently, the weather strip 50 is cut to a predetermined size, and corner portions and the like are subjected to injection molding, if necessary, thereby obtaining the product.

In this case, as shown in FIG. 9, a fine pattern, such as an embossed pattern 157c, is provided on the surface of the decoration layer 157 to obtain a subdued vision by suppressing the gloss for the purpose of matching with interior products in the vehicle compartment and also to improve the tactile feel. However, if the embossed pattern is only provided, the pattern is monotonous, making it impossible to obtain a sufficient aesthetic quality or tactile feel. In addition, to produce a sense of high quality, there were those in which, instead of the decoration layer 157, a flocked fabric, a fabric of thick cloth, or the like is conventionally adhered to surfaces of a trim part 52 and a cover lip 53 of the weather strip body 51 so as to produce a sense of high quality.

However, the adhesion of the flocked fabric, the fabric of thick cloth, or the like requires a flocking or adhering process separately from the extrusion process of the weather strip body 51, so that many facilities are required and much time, trouble and cost are involved.

SUMMARY OF THE INVENTION

For this reason, an object of the invention is to provide an extruded product in which a decoration layer matching interior products in the vehicle compartment and having a surface pattern giving a sense of high quality can be provided easily at low cost.

To attain the above object, in accordance with a first aspect of the invention there is provided an extruded product formed by extrusion molding and continuing in a longitudinal direction, comprising: an extruded product body; and a decoration layer provided integrally on a surface of the extruded product body, wherein the decoration layer is provided on a substantially entire surface of the decoration layer by combining an irregular surface pattern and a plurality of linear grooves on the surface thereof, and a depth of the linear groove is deeper than a depth of the irregular surface pattern.

In the first aspect of the invention, the extruded product formed by extrusion molding and continuing in a longitudinal direction has the extruded product body and the decoration layer provided integrally on the surface of the extruded product body. Therefore, the color and the material of the decoration layer can be selected separately from the extruded product, and it is possible to easily change the color and the like of the decoration layer in correspondence with an environment in which the extruded product is used. Hence, this arrangement is favorable in terms of design.

The decoration layer is provided integrally with the extruded product body, and the decoration layer can be formed continuously in a series of process after the extrusion molding of the extruded product.

Since the decoration layer is provided on a substantially entire surface of the decoration layer by combining the irregular surface pattern and the plurality of linear grooves on the surface thereof, a texture giving a sense of high quality and a good tactile feel like those of a fabric or leather is created by the action of both the irregular surface pattern and the plurality of linear grooves. The irregular surface pattern referred to herein is a fine irregular surface pattern provided on the surface of the decoration layer and may be a linear or spot-like pattern. The linear grooves refer to a linear groove pattern consisting of a linear, curvilinear, or mesh-like pattern having a deeper depth and a larger interval than the irregular surface pattern.

Since the depth of the linear grooves is deeper than that of the irregular surface pattern, large grooves of the linear grooves are formed, and fine projections and recesses or grooves of the irregular surface pattern are formed between these grooves. Thus, various patterns, e.g., a geometrical pattern, a cloth pattern, a suede-like pattern, or the like, can be expressed by the two kinds of different sized projections and recesses or grooves.

In accordance with a second aspect of the invention, the depth of the irregular surface pattern is 30 μm to 150 μm, and a groove of the linear groove is formed with a depth of 160 μm to 800 μm.

In the second aspect of the invention, since the depth of the irregular surface pattern is 30 µm to 150 µm, and a groove of the linear groove is formed with a depth of 160 µm to 800 µm, the irregular surface pattern is capable of expressing a fine pattern, while the linear grooves are formed as sufficiently large grooves as compared to recesses of the irregular surface pattern, such that the irregular surface pattern is placed over the linear grooves. For this reason, the two kinds of patterns are formed in a superposed and composite manner. Thus, both the grooves and the recesses exhibit a composite effect, and are capable of expressing various patterns and forming a complex pattern giving a sense of high quality.

In accordance with a third aspect of the invention, the width of an opening of the linear groove is formed to be 160 µm to 800 µm, and the width of a root portion of one protruding portion formed by adjacent ones of the linear grooves is formed to be 160 µm to 800 µm.

In the third aspect of the invention, the width of an opening of the linear groove and the width of a protruding portion between the linear grooves are set in the same range, and the depths of the grooves are set to be identical. Therefore, the decoration layer looks like a fabric, and it is possible to form a pattern creating a sense of high quality similar to that of a piece to which a woven fabric is adhered.

In accordance with a fourth aspect of the invention, an interval between adjacent ones of the linear grooves is 400 µm to 1600 µm.

In the fourth aspect of the invention, since the interval between adjacent ones of the linear grooves is 400 µm to 1600 µm, the interval between the linear grooves is similar to that of a cloth with a sense of high quality which is a fabric. Thus, it is possible to obtain an appearance and a tactile feel close to those of a fabric, and it is possible to form a decoration layer excelling in the tactile feel.

In accordance with a fifth aspect of the invention, the irregular surface pattern is one of an embossed pattern and a foamed pattern that is formed in an irregular surface by foaming.

In the fifth aspect of the invention, since the irregular surface pattern is one of an embossed pattern and a foamed pattern formed by foaming, in the case where an embossed pattern is formed on the decoration layer, it is possible to form a pattern giving a sense of high quality by forming a pattern which has a subdued gloss by suppressing the luster on the surface and which, coupled with the linear grooves, is leather-like.

In the case where the irregular surface pattern on the decoration layer is an irregular surface pattern formed by foaming, the foamed pattern can be formed easily by mixing a foaming agent in the material for forming the decoration layer, and the surface can be made to impart a soft feel by micro-foaming.

In accordance with a sixth aspect of the invention, the linear grooves are formed by a mesh pattern.

In the sixth aspect of the invention, since the linear grooves are formed by a mesh pattern, the decoration layer has a mesh pattern in which the irregular surface pattern is formed by a fine irregular surface pattern, and the linear grooves are provided in the longitudinal direction and the transverse direction. By virtue of this mesh pattern, it is possible to obtain the appearance of a weave texture in which yarn is interwoven in the longitudinal direction and the transverse direction. By virtue of the fine projections and recesses, it is possible to obtain a state of fine surfaces of yarn making up the weave texture. Therefore, by combining the irregular surface pattern and the mesh pattern, it is possible to form a fabric-like surface of the decoration layer and obtain an appearance and a tactile feel similar to those of a fabric, thereby making it possible to form a decoration layer excelling in the tactile feel.

In accordance with a seventh aspect of the invention, the linear grooves are formed by one of a rectilinear pattern and a curvilinear pattern with respect to the longitudinal direction or a transverse direction.

In the seventh aspect of the invention, since the linear grooves are formed by one of a rectilinear pattern and a curvilinear pattern with respect to the longitudinal direction or the transverse direction, in the case of the rectilinear pattern, it is possible to form a geometrical or weave texture-like pattern and form a pattern giving a sense of high quality, coupled with the fine irregular surface pattern. In the case of the curvilinear pattern, it is possible to form a leather-like or suede-like pattern, coupled with the fine irregular surface pattern, making it possible to form various patterns. It should be noted that, as for the rectilinear or curvilinear pattern, the linear grooves may be provided either in the longitudinal direction or in the transverse direction or in both of the longitudinal direction and the transverse direction.

In accordance with an eighth aspect of the invention, the linear grooves include a multiplicity of groove portions provided in the transverse direction and a multiplicity of groove portions provided in the longitudinal direction and deeper than the transverse groove portions.

In the eighth aspect of the invention, since the linear grooves include a multiplicity of groove portions provided in the transverse direction and a multiplicity of groove portions provided in the longitudinal direction and deeper than the transverse groove portions, grooves or projections and recesses having three kinds of different depths, coupled with the irregular surface pattern, can be formed on the same surface. Therefore, it is possible to form more diverse patterns of good appearance and giving a sense of high quality.

In accordance with a ninth aspect of the invention, the extruded product is a weather strip for a vehicle, the extruded product body is a weather strip body, the decoration layer is provided on upper surfaces of a trim part and a cover lip of the weather strip body, the weather strip body is formed of EPDM rubber, and the decoration layer is formed of a thermoplastic elastomer.

In the ninth aspect of the invention, since the extruded product is a weather strip for a vehicle, the extruded product body is a weather strip body, and the decoration layer is provided on upper surfaces of the trim part and the cover lip of the weather strip body, the decoration layer can be provided on the surface portion of the weather strip which can be observed from the inner side of the vehicle compartment and is installed at an opening portion of a door or the like of the vehicle. For this reason, a decoration layer having a color and a pattern which match interior products in the vehicle compartment can be provided on the weather strip. In addition, a surface which gives a soft and good tactile feel can be provided on the decoration layer.

Since the weather strip body is formed of EPDM rubber, and the decoration layer is formed of a thermoplastic elastomer, in a case where an olefin thermoplastic elastomer is used as the thermoplastic elastomer, the weather strip body and the decoration layer can be easily bonded. In a case where the decoration layer is provided continuously on the vulcanized weather strip body for a vehicle formed of EPDM rubber, at the time of bonding the decoration layer, the decoration layer can easily be thermobonded to the weather strip body for a vehicle heated by vulcanization, without requiring heating of the vulcanization.

In addition, in the case where the thermoplastic elastomer is used, vulcanization is not required after the formation of the surface pattern on the extruded decoration layer, and the formed pattern does not disappear or the projections and the recesses do not become small.

In addition, since the weather strip body is formed of EPDM, it is possible to obtain an inexpensive product which excels in weather resistance and has rigidity, flexibility, and resiliency sufficient to hold the shape by virtue of vulcanization. Since the decoration layer is formed of the olefin thermoplastic elastomer and is formed of the same olefin material as the extruded product body, bonding is facilitated. Furthermore, by the use of an adhesive, bonding can be effected more firmly.

In addition, since the decoration layer is formed of the thermoplastic elastomer, vulcanization is not required after the formation of the decoration layer, and the decoration layer is able to retain flexibility even after it is bonded to EPDM.

In the invention, since the extruded product has the decoration layer provided integrally on the surface of the extruded product body, the color and the material of the decoration layer can be selected separately from the extruded product, and it is possible to easily change the pattern and the like of the decoration layer in tune with the design of the place where the extruded product is used. Hence, this arrangement is favorable in terms of design. Since the decoration layer is provided on a substantially entire surface of the decoration layer by combining the irregular surface pattern and the plurality of linear grooves on the surface thereof, a texture giving a sense of high quality like that of a fabric or leather is created by the action of both the irregular surface pattern and the plurality of linear grooves.

Since the depth of the linear grooves is deeper than that of the irregular surface pattern, large grooves of the linear grooves are formed, and fine grooves of the irregular surface pattern are formed between these grooves. Thus, various patterns, e.g., a geometrical pattern, a cloth pattern, a suede-like pattern, or the like, can be expressed by the two or more kinds of different sized projections and recesses.

DETAILED DESCRIPTION OF THE PREFERRED EMBODIMENTS

Referring to FIGS. 1 to 8, a description will be given of an embodiment of the invention. In this embodiment a description will be given by citing as an example a case in which the invention is applied to a weather strip for a vehicle, but the invention is applicable to other extruded products which are formed by extrusion molding.

Figure 1:
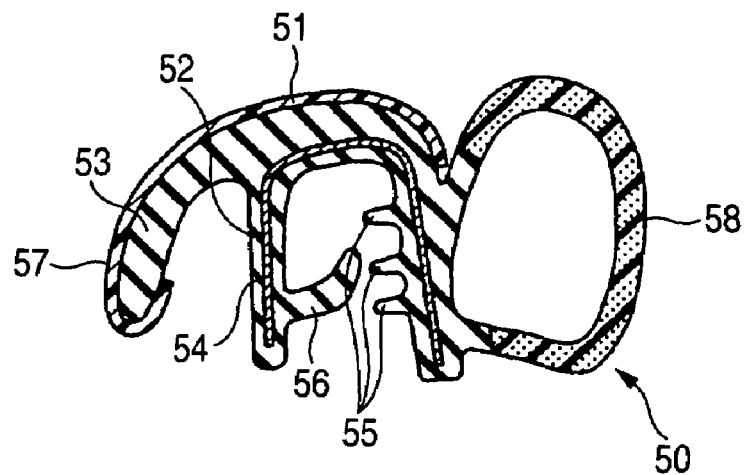
FIG. 1 is a cross-sectional view of a weather strip for a vehicle in accordance with an embodiment of the invention.

FIG. 1 is a cross-sectional view of a weather strip for a vehicle 50 which is manufactured by the extrusion molding method of this embodiment. The weather strip 50 for a vehicle is comprised of a weather strip body 51 consisting of a trim part 52 and a hollow seal portion 58, as well as a decoration layer 57 provided on upper surfaces of the trim part 52 and a cover lip 53.

The trim part 52 is formed with a substantially U-shaped cross section and has a core metal 54 embedded therein, and the cover lip 53 extending toward the inner side of the vehicle compartment is provided on its upper portion. A plurality of vehicle outer-side holding lips 55 and one vehicle inner-side holding lip 56 are provided on an inner surface with a substantially U-shaped cross section of the trim part 52. As a flange of a door or a vehicle body opening portion is inserted into the U-shaped interior of the trim part 52 and is held by the vehicle outer-side holding lips 55 and the vehicle inner-side holding lip 56, the weather strip 50 is fitted.

The trim part 52 is formed of a solid material or a microfoamed material such as rubber, a thermoplastic elastomer, or a soft synthetic resin, and the hollow seal portion 58 is formed of a sponge material such as rubber, a thermoplastic elastomer, or the like for the sake of flexibility and resiliency. As the rubber, it is possible to EPDM (ethylene-propylene-diene-methylene) rubber which is a synthetic rubber.

The decoration layer 57 is secured to an upper surface of the trim part 52 and an upper surface of the cover lip 53. The upper surfaces of the trim part 52 and the cover lip 53 can be viewed from the inner side of the vehicle compartment. For this reason, as for the decoration layer 57, it is necessary to change its surface pattern in correspondence with the color and luster of the interior of the vehicle in terms of design, and the decoration layer 57 having a surface pattern which matches the interior is used.

The decoration layer 57 is formed of a thermoplastic elastomer or a soft synthetic resin material or a foamed material thereof. As the thermoplastic elastomer, in a case where the weather strip body 51 is formed of EPDM rubber, it is preferable to use an olefin thermoplastic elastomer since the bonding between the weather strip body 51 and the decoration layer 57 becomes strong.

Figure 3:
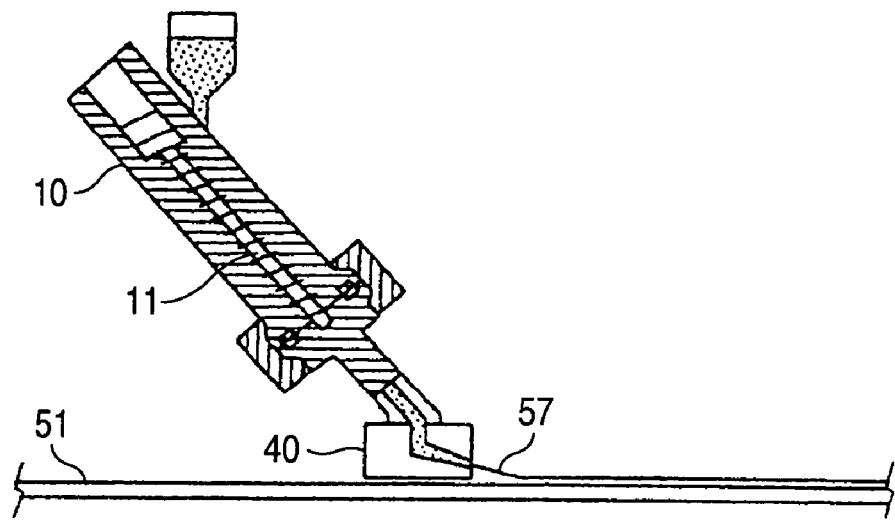
FIG. 3 is a detailed cross-sectional view illustrating a head of an extruding machine and an extruding die for extrusion molding the decoration layer shown in FIG. 2.

As for the decoration layer 57 in this embodiment, as shown in FIG. 3, a sheet-like decoration layer having a substantially fixed thickness is formed by extrusion molding, and is formed in strip shape in close contact with the weather strip 50 in the longitudinal direction of the weather strip 50. Then, as shown in FIG. 1, the decoration layer 57 covers the trim part such that one widthwise side end of the decoration layer 57 is provided up to a vicinity of a boundary between the trim part 52 and the hollow seal portion 58. The other widthwise side end of the decoration layer 57 covers and envelops a distal end of the cover lip 53, and the decoration layer 57 completely covers the vehicle compartment inner sides of the cover lip 53 and the trim part 52.

Figure 4:
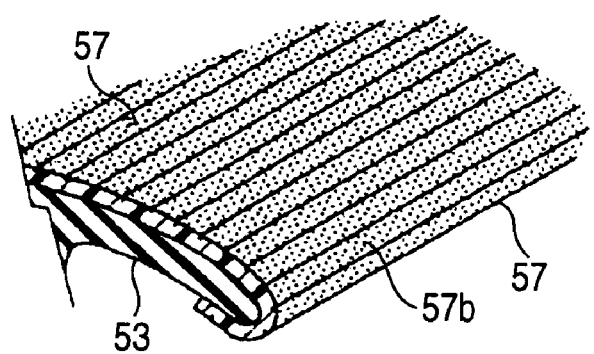
FIG. 4 is an enlarged perspective view illustrating a portion of the decoration layer of the weather strip for a vehicle in accordance with the embodiment of the invention.

FIG. 4 is a partially enlarged perspective view of the decoration layer 57 covering the cover lip 53.

A fine irregular surface pattern 57c and a plurality of linear groove portions 57b continuing in the longitudinal direction are provided on the surface of the decoration layer 57. The irregular surface pattern 57*c* is provided over a substantially entire surface of the decoration layer 57. The irregular surface pattern 57*c* may be an embossed pattern or a fine dot-like pattern. Furthermore, the irregular surface pattern 57*c* may be a fine irregular surface which is provided on the surface of the decoration layer 57 by foaming it. By virtue of these irregular surface patterns 57*c*, it is possible to create a sense of high quality and improve the tactile feel by suppressing the gloss on the surface of the decoration layer 57.

As for the plurality of linear groove portions 57*b* continuing in the longitudinal direction, a multiplicity of them are provided rectilinearly in the longitudinal direction. The interval between adjacent ones of the linear grooves 57*b* is greater than the interval between projections on the irregular surface pattern 57*c* and is set to approximately 1 μm in this embodiment, but the interval may be selected, as required, according to the pattern.

The depth of the irregular surface pattern 57*c* is preferably 30 μm to 150 μm, more preferably 50 μm to 100 μm. As for the depth of the groove of the linear groove 57*b*, a depth of 160 μm to 800 μm is preferable, and the groove of the linear groove 57*b* is more preferably formed with a depth of 200 μm to 600 μm. By virtue of the depths of these patterns, the irregular surface pattern 57*c* is capable of expressing a fine pattern, while the linear grooves 57*b* are formed as sufficiently large grooves as compared to recesses of the irregular surface pattern 57*c*, such that the irregular surface pattern 57*c* is placed over the linear grooves 57*b*. For this reason, the two kinds of patterns are formed in a composite or superposed manner.

Since the linear grooves 57*b* and the irregular surface pattern 57*c* are combined on the same surface and are formed simultaneously, it is possible to form various patterns and to obtain a favorable tactile feel like that of a fabric or leather.

Figure 5:
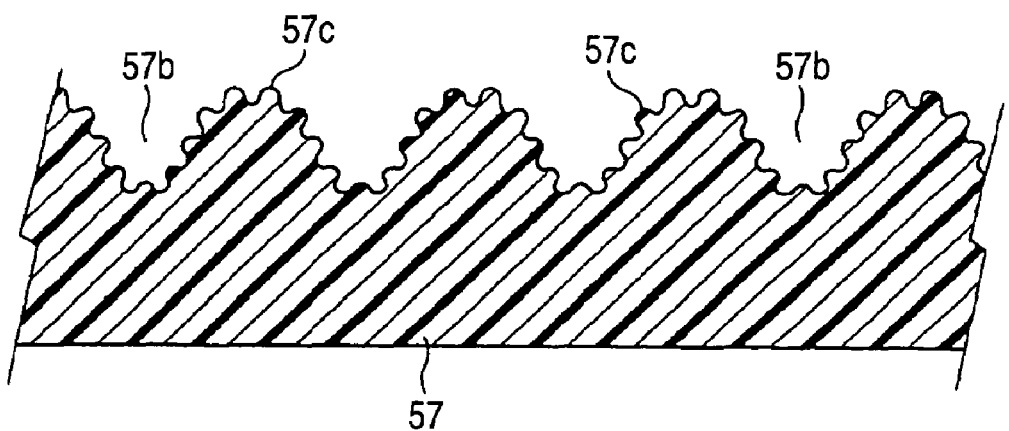
FIG. 5 is a partially enlarged cross-sectional view of the decoration layer of the weather strip for a vehicle shown in FIG. 4.

FIG. 5 is a partially enlarged cross-sectional view of the surface of the decoration layer 57 shown in FIG. 4.

The surface of the decoration layer 57 is formed by the linear grooves 57*b*, which together form large projections and recesses and continue in the longitudinal direction, as well as the irregular surface pattern 57*c* which is provided as small projections and recesses on the entire surfaces of the linear grooves 57*b*. As described above, the depths of the irregular surface pattern 57*c* and the linear grooves 57*b* differ substantially, and since the irregular surface pattern 57*c* and the linear grooves are formed in a composite manner, it is possible to form various patterns. Furthermore, by virtue of both the small projections and recesses and the large projections and recesses, it is possible to obtain a high-level aesthetic quality and tactile feel.

Figure 6:
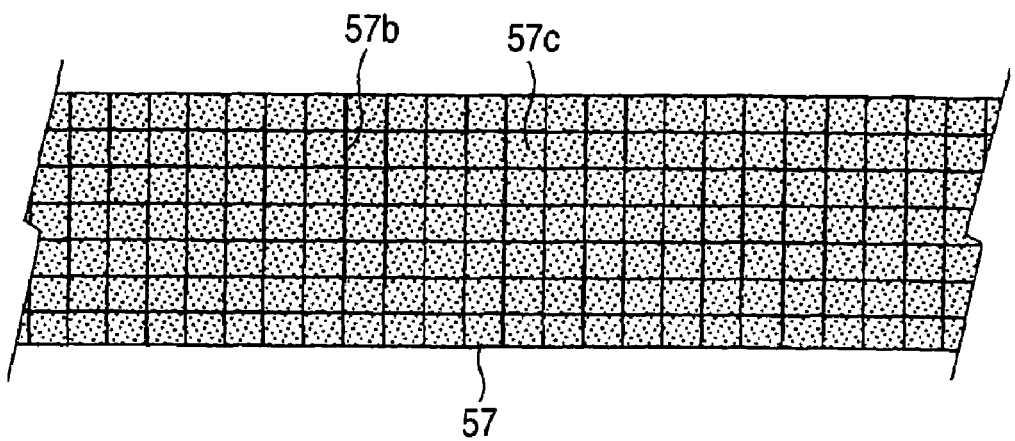
FIG. 6 is a partial schematic plan view of the decoration layer of the weather strip for a vehicle in accordance with another embodiment of the invention.

Next, FIG. 6 is a partially enlarged schematic view of the surface illustrating another embodiment of the surface pattern of the decoration layer 57.

As for the decoration layer 57 in this embodiment, the irregular surface pattern 57*c* is formed by a fine irregular surface pattern, and a mesh pattern is formed in which the linear grooves 57*b* are provided in the longitudinal direction and the transverse direction. By virtue of this mesh pattern, it is possible to obtain an appearance of cloth, and by virtue of the fine projections and recesses, it is possible to obtain the state of fine irregular surfaces of yarn making up the cloth. Therefore, it is possible to obtain an appearance and a tactile feel similar to those of a fabric.

Although FIG. 6 is depicted schematically, in this embodiment, the width of the opening of the linear groove is formed to be 160 μm to 800 μm, and the width of a root portion of one protruding portion formed by adjacent ones of the linear grooves is formed to be 160 μm to 1600 μm. Further, the interval between adjacent ones of the linear grooves 57*b* is smaller than in the embodiment shown in FIG. 4, and is preferably set to be approximately 400 μm to 1600 μm or thereabouts in this embodiment. In a case where the interval of the linear pattern is 400 μm or less, the intervals are too close together, so that the tactile feel close to those of a fabric cannot be obtained. Meanwhile, in a case where the interval is 1600 μm or more, the interval is too wide and the surface becomes coarse, making it impossible to obtain a sense of high quality. The interval can be selected, as required, depending on the portion where the pattern is used or on the pattern required.

It should be noted that although a description has been given of the form of the mesh pattern in which the linear grooves 57*b* are provided in the longitudinal direction and the transverse direction, this embodiment can similarly be applied to the case where the linear grooves 57*b* are provided only in the longitudinal direction, as shown in FIG. 4, if a high-quality tactile feel is to be obtained.

The depth of the irregular surface pattern 57*c* is preferably 30 μm to 150 μm in the same way as the above-described embodiment. Since the linear grooves 57*b* and the irregular surface pattern 57*c* are formed simultaneously on the same surface in a superposed manner, the tactile feels of both of the linear grooves 57*b* and the irregular surface pattern 57*c* are combined, making it possible to obtain a favorable tactile feel like that of a fabric.

Figure 7:
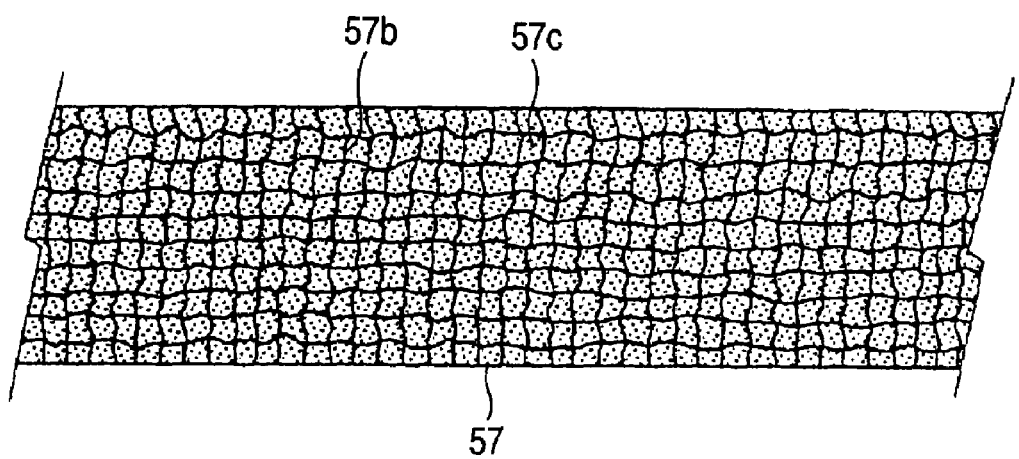
FIG. 7 is a partial schematic plan view of the decoration layer of the weather strip for a vehicle in accordance with still another embodiment of the invention.

Next, FIG. 7 is a partially enlarged schematic view of the surface illustrating still another embodiment of the surface pattern of the decoration layer 57.

As for the decoration layer 57 in this embodiment, the irregular surface pattern 57*c* is formed by an embossed pattern, and a curvilinear mesh pattern is formed in which the linear grooves 57*b* constituted by curved lines are provided both in the longitudinal direction and in the transverse direction. By virtue of this curvilinear mesh pattern, it is possible to obtain an appearance of leather and, coupled with the embossed pattern, it is possible to obtain the state of a fine surface of leather, making it possible to obtain an appearance similar to that of leather.

Figure 8:
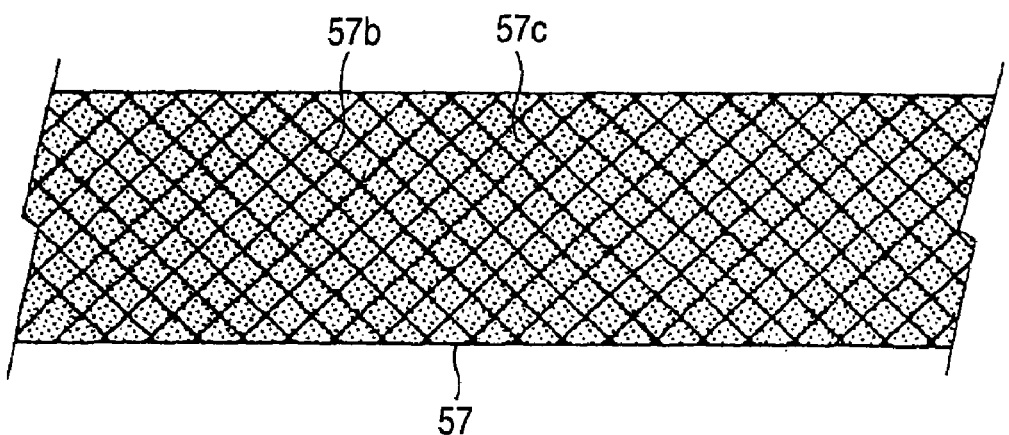
FIG. 8 is a partial schematic plan view of the decoration layer of the weather strip for a vehicle in accordance with a further embodiment of the invention.
Figure 9:
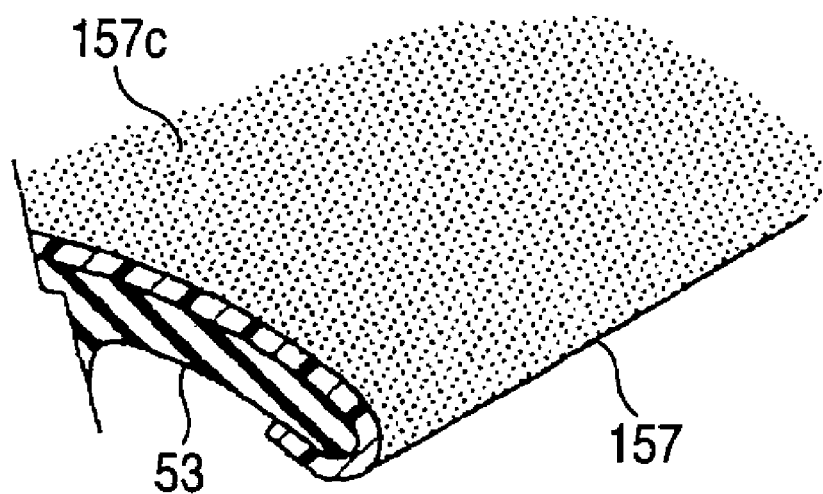
FIG. 9 is an enlarged perspective view illustrating a portion of the decoration layer of a conventional weather strip for a vehicle.

Further, FIG. 8 is a partially enlarged schematic view of the surface illustrating a further embodiment of the surface pattern of the decoration layer 57.

As for the decoration layer 57 in this embodiment, the irregular surface pattern 57*c* is formed by the foaming of the base material of the decoration layer 57, while one set of the linear grooves 57*b* and the other set of the linear grooves 57*b* are respectively provided diagonally in mutually oppositely inclined directions with respect to the longitudinal direction, thereby forming a rectilinear mesh pattern.

By virtue of the linear grooves 57*b* provided diagonally, it is possible to obtain the appearance of a fabric, and by virtue of the fine projections and recesses formed by foaming, it is possible obtain a state close to that of a fine irregular surface of yarn making up a fabric. Therefore, it is possible to obtain an appearance similar to that of a fabric and a soft tactile feel by foaming.

Figure 2:
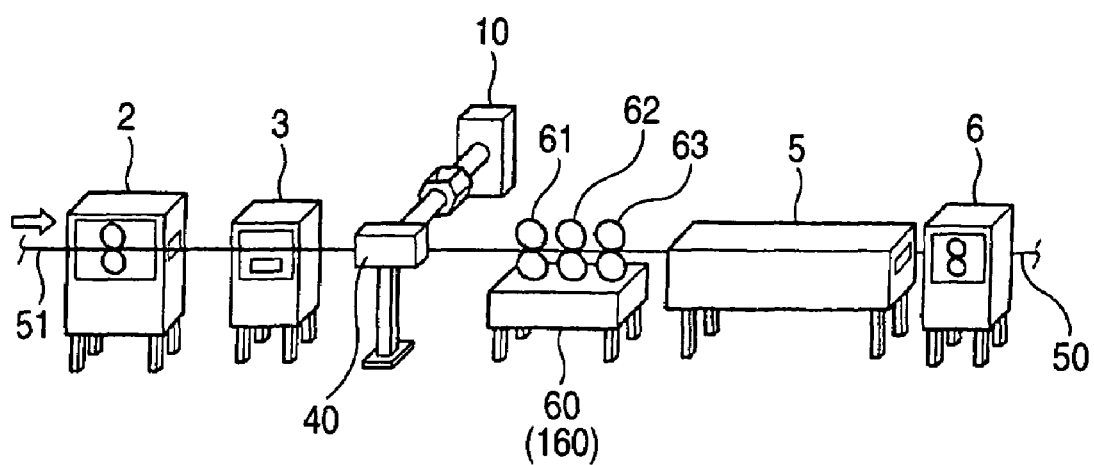
FIG. 2 is a schematic diagram illustrating the process for extrusion molding a decoration layer in the weather strip for a vehicle in accordance with the embodiment of the invention.

Next, a description will be given of the method of manufacturing the weather strip 50. FIG. 2 is a schematic diagram illustrating a part of a manufacturing line of the weather strip 50.

As for the weather strip 50, the weather strip body 51 is first formed by an extrusion molding machine (not shown). The core metal 54 is supplied to the extrusion molding machine, and a solid material for forming the trim part 52 and the cover lip 53 and a sponge material for forming the hollow seal portion 58 are simultaneously extruded by the extrusion molding machine, thereby extruded the weather strip body 51. Subsequently, in a case where these materials are rubbers, the weather strip body 51 is transferred to a high-frequency heating device, a hot air heater (not shown), or the like, and is subjected to heating so as to be vulcanized.

As shown in FIG. 2, the vulcanized weather strip body 51 is sent to a primary performing machine 2 where it is slightly bent by rollers of the primary performing machine 2 to facilitate the application of a primer and the bonding of the decoration layer 57.

After the primary performer 2, the weather strip body 51 is sent to a primer application machine 3. Here, the primer is applied to the upper portion of the trim part 52 and the cover lip 53 of the weather strip body 51 to which the decoration layer 57 is to be secured, so as to strengthen the securing force of the decoration layer 57.

The weather strip body 51 with the primer applied thereto is sent to an extruding die 40 to which a nozzle of an extrusion molding machine 10 is attached. Here, The decoration layer 57 having a color corresponding to the interior of the vehicle compartment is extruded in sheet form onto upper surfaces of the trim part 52 and the cover lip 53 of the weather strip body 51 (see FIG. 3). A description will be given later of the details of formation of the decoration layer 57 by the extruding die 40.

As shown in FIG. 2, the weather strip body 51 having the decoration layer 57 extruded onto the upper surfaces of the trim part 52 and the cover lip 53 is sent to a laminating machine 60. In the laminating machine 60, by means of rollers 61, 62, and 63 the decoration layer 57 is pressed onto the weather strip body 51, and a pattern is formed on the surface of the decoration layer 57, as will be described later. Further, the side end portion of the decoration layer 57 is bent around the reverse surface of the distal end of the cover lip 53 by the roller 63, thereby compression bonding the weather strip body 51 and the decoration layer 57.

At this time, the weather strip body 51 remains in a warm state (about 100° C.) due to having been vulcanized, and the temperature of the decoration layer 57 is high since it was extruded immediately before then. Thus, coupled with the bonding action of the primer, the decoration layer 57 is firmly bonded to the weather strip body 51.

Furthermore, in a case where the weather strip body 51 and the decoration layer 57 are formed of materials of the same olefin base, such as the former being formed of EPDM and the latter being formed of an olefin thermoplastic elastomer, the weather strip body 51 and the decoration layer 57 are bonded more firmly.

The weather strip 50 with the decoration layer 57 secured thereto is sent to a cooling device 5 and is cooled by water or cool air.

The weather strip 50 which came out of the cooling device 5 is taken up by a takeup machine 6 and is cut to a predetermined size. Subsequently, corner portions, end portions, and the like are formed by injection molding in conformity with corner portions or the like of the door or the vehicle body, and a product is thereby formed. It should be noted that, in some cases, a double-sided pressure sensitive adhesive tape or clips are attached to the weather strip before being finished as a product.

Next, referring to FIG. 3, a description will be given of the process of extruding the decoration layer 57 and securing the decoration layer 57 to the weather strip body 51.

FIG. 3 is a cross-sectional view illustrating the process of extrusion molding the decoration layer 57.

To provide the decoration layer 57 on the upper surfaces of the trim part 52 and the cover lip 53 of the weather strip body 51, a screw 11 of the extrusion molding machine 10 is first rotated, as shown in FIG. 3, to extrude the material of the decoration layer 57 into the extruding die 40. The extruding material is extruded from the extruding die 40 in sheet form and with a fixed thickness. Subsequently, a surface pattern is formed on the decoration layer 57 by the laminating machine 60, and the decoration layer 57 is compression bonded and adhered to the weather strip body 51 by the rollers 61, 62, and 63 in conformity with the shape of the weather strip body 51.

At this time, the decoration layer 57 is bent around and bonded in such a manner as to envelop the distal end of the cover lip of the weather strip body 51 by the rollers 61, 62, and 63 of the laminating machine 60.

Next, a description will be given of the method of forming a surface pattern on the decoration layer 57.

In FIG. 4, the fine irregular surface pattern 57c and the plurality of linear groove portions 57b continuing in the longitudinal direction are provided on the surface of the decoration layer 57. In the surface pattern shown in FIG. 4, the linear grooves 57b are formed by a plurality of ridges formed at an outlet of the extruding die 40, and an irregular surface pattern is subsequently formed on the surface of the decoration layer 57 by the first roller 61 of the laminating machine 60. The irregular surface pattern 57c is obtained by the transfer of a pattern provided on the surface of the first roller 61, and the irregular surface pattern 57c may be a fine irregular surface pattern, an embossed pattern, or a fine dot-like irregular surface pattern. Thus, both the fine irregular surface pattern 57c and the linear grooves 57b continuing in the longitudinal direction can be formed compositely on the surface of the decoration layer 57.

It should be noted that the linear grooves 57b may not be formed at the outlet of the extruding die 40, and may be formed by providing the ridges on the surface of the second roller 62 and by pressing the second roller 62.

The decoration layer 57 provided with the pattern is compression bonded and adhered to the upper surface of the weather strip body 51 by the second roller 62. A widthwise end portion of the decoration layer 57 is bent around and bonded in such a manner as to envelop the distal end of the cover lip 53 by the third roller 63 of the laminating machine 60. When the rollers 61, 62, and 63 are brought into pressure contact with the decoration layer 57, lower rollers for supporting the cover lip 53 are provided below the rollers 61, 62, and 63.

Furthermore, the irregular surface pattern 57c may be a fine irregular surface provided on the surface of the decoration layer 57 by foaming the decoration layer 57. In this case, the first roller 61 can be omitted.

Next, a description will be given of the method of forming the surface pattern of the decoration layer 57 shown in FIG. 6. In the decoration layer 57 shown in FIG. 6, the irregular surface pattern 57c is formed by a fine irregular surface pattern, and a mesh pattern is formed in which the linear grooves 57b are provided in the longitudinal direction and the transverse direction.

In the surface pattern shown in FIG. 6, the decoration layer 57 having a strip shape and a substantially fixed thickness is extruded from the extruding die 40, and an irregular surface pattern is subsequently formed on the surface of the decoration layer 57 by the first roller 61 of the laminating machine 60. The irregular surface pattern 57c is obtained by the transfer of a pattern provided on the surface of the first roller 61, as in the case of FIG. 4, and the irregular surface pattern 57c may be a fine irregular surface pattern, an embossed pattern, or a fine dot-like irregular surface pattern. Next, a mesh pattern having a depth deeper than that of the irregular surface pattern 57c and a large mesh interval is formed as the linear grooves 57b over the irregular surface pattern 57c by the second roller 62.

Thus, both the fine irregular surface pattern 57c and the linear grooves 57b continuing in the longitudinal direction and the transverse direction can be formed compositely on the surface of the decoration layer 57.

The decoration layer 57 provided with the pattern is compression bonded and adhered to the upper surface of the weather strip body 51 by the third roller 63.

It should be noted that the formation of the mesh pattern and the compression bonding to the weather strip body 51 may be effected simultaneously by the second roller 62.

Next, a description will be given of the method of forming the surface pattern of the decoration layer 57 shown in FIG. 7. In the decoration layer 57 of this embodiment shown in FIG. 7, the irregular surface pattern 57c is formed by an embossed pattern, and a curvilinear pattern is formed in which in which the linear grooves 57b constituted by curved lines are provided both in the longitudinal direction and in the transverse direction.

In the surface pattern shown in FIG. 7, the decoration layer 57 having a strip shape and a substantially fixed thickness is extruded from the extruding die 40, and an irregular surface pattern 57c which is an embossed pattern is subsequently formed on the surface of the decoration layer 57 by the first roller 61 of the laminating machine 60. The irregular surface pattern 57c is obtained by the transfer of a pattern provided on the surface of the first roller 61, as in the case of FIG. 4.

Next, a curvilinear pattern provided on the surface of the second roller 62 and having a depth deeper than that of the irregular surface pattern 57c and a large interval between projections is pressed against the surface of the decoration layer 57, and is thereby formed as the linear grooves 57b over the irregular surface pattern 57c.

Thus, both the fine irregular surface pattern 57c and the curvilinear grooves 57b continuing in the longitudinal direction and the transverse direction can be formed compositely on the surface of the decoration layer 57.

Next, a description will be given of the method of forming the surface pattern of the decoration layer 57 shown in FIG. 8. In the decoration layer 57 shown in FIG. 8, the irregular surface pattern 57c is formed by the foaming of the base material constituting the decoration layer 57, while one set of the linear grooves 57b and the other set of the linear grooves 57b are respectively provided diagonally in mutually oppositely inclined directions with respect to the longitudinal direction, thereby forming a rectilinear mesh pattern.

In the surface pattern shown in FIG. 8, the decoration layer 57 having a strip shape and a fixed thickness is extruded in a micro-foamed state from the extruding die 40. Subsequently, a rectilinear mesh pattern, which has a depth deeper than that of the foamed pattern and a large interval between projections and is formed by two sets of linear grooves respectively provided diagonally in mutually oppositely inclined directions, is pressed against the surface of the decoration layer 57 by the first roller 61 of the laminating machine 60. Then, the decoration layer 57 is compression bonded to the weather strip body 51 by the second roller 62 and the third roller 63.

Thus, both the fine irregular surface pattern 57c based on foaming and the irregular surface pattern 57b continuing in diagonal directions can be formed compositely on the surface of the decoration layer 57.

Although in the above-described embodiments an example has been shown in which a single decoration layer 57 is extruded from the extruding die 40, two decoration layers having an adhesive layer facing the weather strip body side may be extruded simultaneously and bonded. In this case, linear low density polyethylene (LLDPE) can be used as the adhesive layer and the upper layer can be made of olefin thermoplastic elastomer (TPO) or foamed olefin thermoplastic elastomer (foamed TPO).

In addition, the application of the primer in the above-described embodiments is not essential and may be omitted. Furthermore, the application of the primer may be substituted by the application of an adhesive.

What is claimed is:

1. A weather strip for a vehicle, comprising:
    a weather strip body including an extruded product body continuously extruded in a longitudinal direction thereof;
    lips adapted to secure the weather strip body to a body panel of the vehicle; and
    a decoration layer integrated on an exterior surface of the extruded product wherein
    the extruded product body, includes a U-shaped trim part and a hollow seal portion,
    the hollow seal portion is located on a first side of the trim part,
    a cover lip extends from the extruded product body such that the cover lip is located on a side of the extruded product body that is opposite to the hollow seal portion,
    substantially an entire surface of the external surface of the decoration layer includes a combination of an irregular surface pattern and a linear groove portion,
    the linear groove portion is formed with a plurality of linear grooves,
    a depth of the linear grooves is larger than a depth of irregularities on the irregular surface pattern,
    the depth of the irregularities on the irregular surface pattern is in a range of 30 μm to 150 μm, and the depth of the linear grooves is in a range of 160 μm to 800 μm,
    a width of an opening of the linear grooves is formed in a range of 160 μm to 800 μm, and a width of a root portion of one protruding portion formed by adjacent ones of the linear grooves is formed in a range of 160 μm to 800 μm, and
    an interval between adjacent ones of the linear grooves is in a range of 400 μm to 1600 μm.

2. The weather strip for a vehicle according to claim 1, wherein the irregular surface pattern is one of an embossed pattern and a foamed surface pattern.

3. The weather strip for a vehicle according to claim 1, wherein the linear groove portions is formed in a mesh pattern.

4. The weather strip for a vehicle according to claim 1, wherein the linear groove portion is formed in one of a rectilinear pattern and a curvilinear pattern with respect to a longitudinal direction or a transverse direction of the extruded product.

5. The weather strip for a vehicle according to claim 1, wherein the linear groove portion includes traverse grooves provided in a transverse direction of the extruded product and longitudinal grooves provided in a longitudinal direction of the extruded product that are deeper than the transverse grooves.

6. The weather strip for a vehicle according to claim 1, wherein the decoration layer is provided on upper surfaces of a trim part and a cover lip of the weather strip body, the weather strip body is formed of EPDM rubber, and the decoration layer is formed of a thermoplastic elastomer.

* * * * *